US010960591B2

(12) United States Patent
Fick et al.

(10) Patent No.: US 10,960,591 B2
(45) Date of Patent: Mar. 30, 2021

(54) METHOD FOR PERFORMING A CYCLIC PRODUCTION PROCESS

(71) Applicant: KISTLER HOLDING AG, Winterthur (CH)

(72) Inventors: Daniel Fick, Kreuzlingen (CH); Guenter Haag, Stuttgart (DE); Dirk Meyer, Stuttgart (DE); Philipp Liedl, Esslingen (DE)

(73) Assignee: Kistler Holding AG, Winterthur (CH)

( * ) Notice: Subject to any disclaimer, the term of this patent is extended or adjusted under 35 U.S.C. 154(b) by 404 days.

(21) Appl. No.: 16/075,825

(22) PCT Filed: Feb. 16, 2017

(86) PCT No.: PCT/EP2017/053510
§ 371 (c)(1),
(2) Date: Aug. 6, 2018

(87) PCT Pub. No.: WO2017/144344
PCT Pub. Date: Aug. 31, 2017

(65) Prior Publication Data
US 2019/0039274 A1 Feb. 7, 2019

(30) Foreign Application Priority Data
Feb. 16, 2017 (EP) .................... 16156730

(51) Int. Cl.
B29C 45/76 (2006.01)
B29C 45/77 (2006.01)
(Continued)

(52) U.S. Cl.
CPC ............ B29C 45/766 (2013.01); B29C 45/76 (2013.01); B29C 45/768 (2013.01); B29C 45/77 (2013.01);
(Continued)

(58) Field of Classification Search
CPC ........ G05B 13/024; G05B 2219/32097; G05B 19/4187; G05B 19/41875;
(Continued)

(56) References Cited

U.S. PATENT DOCUMENTS 6,517,754 B1 2/2003 Hehl
9,566,735 B2 2/2017 Denes et al.
2013/0270728 A1* 10/2013 Denes .................. B29C 45/762
264/40.1

FOREIGN PATENT DOCUMENTS

DE 19801881 5/1999
DE 102010002174 8/2011
(Continued)

OTHER PUBLICATIONS

International Search Report (PCT/EP2017/053510, dated May 29, 2017.
(Continued)

Primary Examiner — Michael J Brown
(74) Attorney, Agent, or Firm — Dority & Manning, P.A.

(57) ABSTRACT

A method for carrying out a cyclical manufacturing process produces parts within a predefined quality tolerance. After at least one process adjustment variable is changed, a quality feature of the parts produced with a changed process adjustment variable is checked against the range of the quality tolerance of the produced parts. A process characteristic variable zone is formed in an automated manner using at least one determined process characteristic variable variant that is process-stable and for which the process adjustment variable produces acceptable parts.

17 Claims, 6 Drawing Sheets

(51) Int. Cl.
    *B29C 45/84*     (2006.01)
    *G05B 19/41*     (2006.01)
    *G05B 19/418*     (2006.01)
    *G05B 13/02*     (2006.01)
    *B29C 39/10*     (2006.01)

(52) U.S. Cl.
    CPC ........ *B29C 45/84* (2013.01); *G05B 19/41875* (2013.01); *B29C 2945/76939* (2013.01); *B29C 2945/76949* (2013.01); *G05B 2219/2624* (2013.01); *G05B 2219/32186* (2013.01); *G05B 2219/45244* (2013.01); *Y02P 90/02* (2015.11)

(58) Field of Classification Search
    CPC .. G05B 2219/2624; G05B 2219/32186; G05B 2219/45244; B29C 39/10; B29C 64/153; B29C 64/165; B29C 64/20; B29C 64/393; B29C 45/766; B29C 45/76; B29C 45/768; B29C 45/77; B29C 45/84; B29C 2945/76939; B29C 2945/76949; Y02P 90/02
    USPC .......................................................... 700/108
    See application file for complete search history.

(56) References Cited

FOREIGN PATENT DOCUMENTS

| | | |
|---|---|---|
| JP | H08281756 A | 10/1996 |
| JP | 2002500967 A | 1/2002 |
| JP | 2003150226 A | 5/2003 |
| WO | WO 2011/101177 | 8/2011 |

OTHER PUBLICATIONS

Kistler Group: "Kistler News Plastics", Internet, 2015,XP002760972, Gerfunden im Internet: URL:https://www.kistler.com/?type=669&fid=196&model=download [gefunden am Aug. 19, 2016], Seiten 1.2.

Haman, Soromo: "Prozessnahes, Qualit tsmanagement beim SpritzgieBen", Internet, Jun. 4, 2004 (Jun. 4, 2004), XP002760973, Gefunden im Internet: Rl:http://monarch.queosa.de/fileadmin/datajqucosajdocuments/4864/data/Dissertation.pdf [gefunden am Aug. 19, 2016] Siete 14, Seitn 88-107.

Japanese Office Action JP2018544091 dated Aug. 27, 2019, pp. 4.
English translation of pertinent pages, Kistler Group:"Kislter News Plastics", Internet,, 2015,XP002760972, Gefunden im Internet: URL:https://www.kistler.com/?type=669&fid=196&model=download [gefunden am Aug. 19, 2016], Seiten 1.2.

* cited by examiner

METHOD FOR PERFORMING A CYCLIC PRODUCTION PROCESS

CROSS-REFERENCE TO RELATED APPLICATIONS

This application claims priority to International Application Serial No. PCT/EP2017/053510, filed Feb. 16, 2017, which claims priority to EP Application No. 16156730.0, filed Feb. 22, 2016. International Application Serial No. PCT/EP2017/053510 is hereby incorporated herein in its entirety for all purposes by this reference.

TECHNICAL FIELD

The present invention relates to a method for performing a cyclic production process for forming parts and include operations such as casting, injection molding, sintering, etc.

BACKGROUND

A cyclic production process is characterized by operations in industrial production that are repeated in time. A production cycle is complete when all operations were carried out. Examples of a cyclic production process are forming methods such as casting, injection molding, sintering, etc. Thus, on a production facility products can be produced in a manner repeated in time whereby production costs are kept low. On the same production line the same articles having the same properties and often also different articles having similar properties can be produced, however, in the latter case the production facility must be modified to be specific for each product. In the following, the invention will be described using an injection molding process as an example which, however, does not exclude that the invention may be used in other forming methods.

To produce articles with consistent quality the document U.S. Pat. No. 9,566,735, which is hereby incorporated herein by this reference for all purposes, describes a procedure for performing an injection molding process in which sensor data of an injection molding machine are recorded by sensors and evaluated. Sensor data are cavity pressures, temperature values, etc. The articles produced on the injection molding machine are injection molded parts. If online control is performed, an automatic and timely control in the ongoing production process is carried out as to whether a quality characteristic of the injection molded parts produced lies within a quality tolerance range for the injection molded parts produced, i.e. whether it is an acceptable part or not. Quality characteristic and quality tolerance range are predefined. A working point of the injection molding machine is set via process control variables. Process control variables are an injection speed, a holding pressure level, etc. A stability of the injection molding process is monitored by a plurality of process parameters. Process parameters are values derived from the development of measured sensor data with time, such as a maximum value of sensor data in a period of time, a time-specific increase of sensor data, a time period of sensor data, such as a holding time, etc. It can be seen from the process parameters determined in this way if the injection molding process drifts off from stability. To keep the quality of the injection molded parts produced within the quality tolerance ranges for the injection molded parts produced, the working point of the injection molding machine is varied via the process control variables. For this purpose, different process control variables are varied in a hierarchical order so that time-critical process control variables from the response time of the injection molding machine are not changed or are changed only very slowly, if possible.

It is an object of the present invention to further improve a method for performing a cyclic production process.

BRIEF SUMMARY OF THE INVENTION

This object has been achieved by the features described below.

The invention relates to a method for performing a cyclic production process wherein articles are produced in said production process; said production process being set via at least one process control variable; wherein at least one quality characteristic of the articles produced and at least one quality tolerance range for the articles produced are predefined; and wherein at least one process control variable is varied; where for a varied process control variable at least one process parameter variation is determined automatically; checking automatically whether the determined process parameter variation lies within a process stability limit and is stable within the process; checking whether the quality characteristic of the articles produced using a varied process control variable is within the quality tolerance range for the articles produced and, thus, acceptable parts have been produced; and wherein using at least one determined process parameter variation which is stable within the process and the process control variable associated therewith produces acceptable parts a process parameter zone is established automatically.

The invention is based on the finding that a determined process parameter which is used for monitoring the stability of the production process may vary merely due to normal external influences such as air temperature, air pressure, humidity. To ensure that the stability of the production process is not already compromised by such normal external influences leading to loss of quality and rejects, the invention provides for establishing a process parameter zone in which the production process is stable and acceptable parts are produced. Establishing the process parameter zone is performed during a setting of the production process, i.e. prior to the actual production process, and simulates variations in the production process. Individual process operations are performed automatically while the process parameter zone is established. An automatic operation within the meaning of the invention refers to working independently without any influence of an operator of a production facility on the production process. Thus, for a varied process control variable at least one process parameter variation is automatically determined while checking automatically whether the process parameter variation determined lies within a process stability limit and is stable in the process. This has the advantage that the process according to the invention supports and systematically instructs the operator during the setting of the production process, saving time and effort.

As a result, the production process is advantageously monitored by means of the process parameter zone in an easy and timely manner. To this end, at least one process parameter is advantageously determined and monitored within the production cycle of the now ongoing production process. In an alternative, monitoring whether the process parameter determined lies within the process parameter zone is advantageously performed. If the answer is yes, monitoring information is issued that the production cycle produces articles the quality of which lies within the quality tolerance range for the articles produced. In this case, small variations in the process parameter determined which occur within a safety margin with respect to process parameter limits of the process parameter zone may be disregarded since they do not lead to quality loss together with rejects. Therefore, it is indeed no longer required to perform monitoring in the ongoing production process as to whether the quality characteristic of the articles produced actually is within the quality tolerance range for the articles produced which again saves time and effort.

BRIEF DESCRIPTION OF THE DRAWINGS

In the following the invention will be illustrated in more detail referring to the figures in which FIG. 1 schematically shows the components of an injection molding machine for performing a cyclic production process.

DESCRIPTION OF EXEMPLARY EMBODIMENTS OF THE INVENTION

Figure 1:
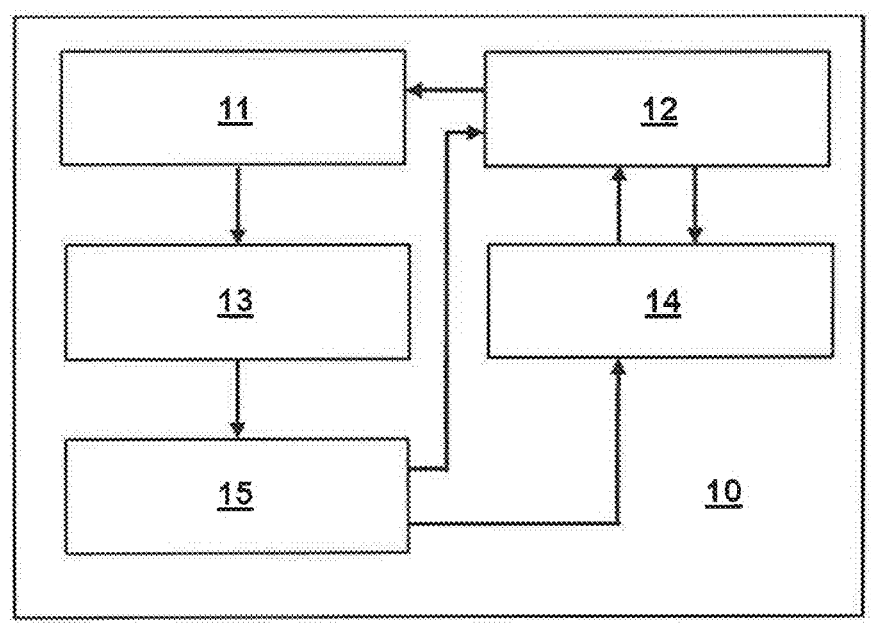

FIG. 1 schematically shows the components of an injection molding machine 10 for performing a cyclic production process. In the production process, injection molded parts are produced as articles. The injection molding machine 10 comprises multiple components 11 such as the machine itself including pump and screw, a tool for binding the molded part, heating and cooling devices, material feeding, devices for monitoring the injection molded parts produced, a rejects gate, etc. that are not shown and described in detail. At least one sensor 13 records sensor data of the components 11. The sensor data are a cavity pressure, a temperature value, etc. The production process is adjustable via at least one process control variable. The process control variable is an injection speed, a holding pressure level, etc. The process control variable can be entered and displayed on an input and output device 12 such as a keyboard, a touchscreen, etc. Advantageously, the input and output device 12 is part of a computer.

A control unit 14 carries out the actual control of the production process. For this purpose, control unit 14 comprises at least a data storage device and a processor. In the data storage device, data such as recorded sensor data, the process control variable entered, etc. can be stored. In the processor, algorithms for controlling the production process can be executed. Advantageously, the control unit 14 is also part of the computer. The skilled artisan being aware of the present invention can also use a controller instead of the control unit in which case the controller controls the process control variable.

Quality monitoring of the injection molded parts produced is performed in a monitoring unit 15. The monitoring unit 15 checks whether at least one quality characteristic of the injection molded parts produced detected by the sensor 13 is within at least one quality tolerance range for the injection molded parts produced, whether acceptable parts have been produced or not. The quality characteristic and the quality tolerance range are predefined. The quality characteristic and the quality tolerance range for an injection molded part are a weight, a dimensional accuracy, a size, a burr formation, a form filling, a burn mark, etc. The quality tolerance range is preferably stored in the data storage device. The quality characteristic, the quality tolerance range as well as the result of checking whether acceptable parts have been produced or not are displayed on the input and output device 12.

For entering the process control variable and monitoring of the production process, the components 11, the input and output device 12 and the control unit 14 are connected via signal lines. In FIG. 1, signal lines are shown as arrows. For recording the sensor data and for transmitting the recorded sensor data the components 11, the sensor 13 and the monitoring unit 15 are also connected via signal lines. Furthermore, for displaying the monitoring result the monitoring unit 15 and the input and output device 12 are connected to each other by a signal line. Moreover, for the transmission of recorded sensor data the monitoring unit 15 and the control unit 14 are connected to each other via a signal line.

Figure 2:
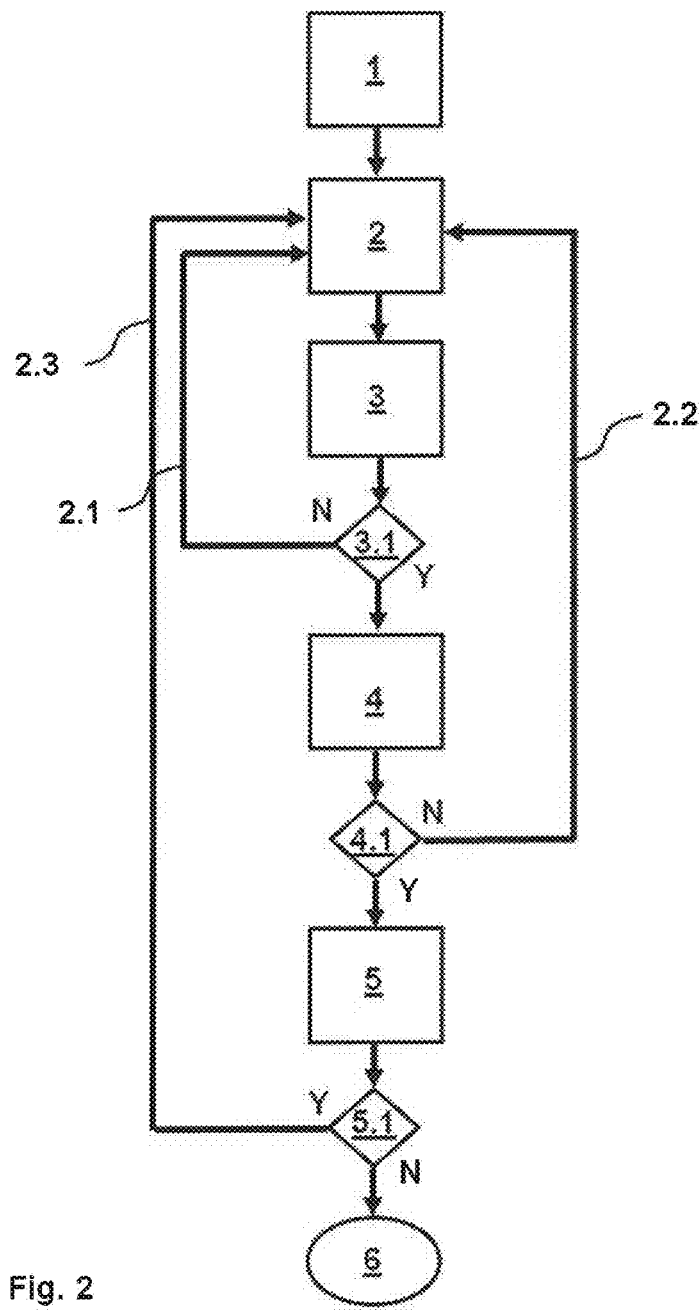
FIG. 2 schematically shows process steps of establishing a process parameter zone for an injection molding machine according to FIG. 1.

FIG. 2 schematically illustrates the process steps of establishing a process parameter zone. In a first process step 1A a process control variable is predetermined. The predetermined process control variable is preferably stored in the data storage device and is displayed on the input and output device 12. By using the predetermined process control variable, the production process can be carried out in a stable manner and produces acceptable parts. Sensor data of the production process operated with the predetermined process control variable are also predetermined. Preferably, the preset sensor data is also stored in the data storage device and displayed on the input and output device 12. Furthermore, at least one process parameter is also predetermined and preferably stored in the data storage device and displayed on the input and output device 12. A process parameter is a value that is derived from the development of sensor data with time such as a maximum value of sensor data within a period of time, a time-specific increase of sensor data, a time period of sensor data such as a holding time, a mean value of sensor data, etc. Specific examples of a process parameter of an injection molding machine are a maximum value of a cavity pressure and a mean value of a tool wall temperature. The representation of the process control variable, the sensor data, the quality tolerance range, the result of checking whether acceptable parts have been produced or not and of the process parameter can be a graphical and/or alphanumerical representation. Knowing the present invention, the process control variable, the sensor data, and the process parameter can also be represented on a monitor screen that is different from the input and output device 12 or can be printed on paper.

In process step 2, at least one process control variable is varied. A difference between the varied process control variable and the process control variable is called an amount of variation and is different from zero. Process step 2 is carried out automatically. Thus, establishing the process parameter zone simulates changes in the process control variable. Preferably, the two process control variables injection speed and holding pressure level are varied. Being aware of the present invention, those skilled in the art can represent the varied process control variable alphanumerically or graphically on the input and output device or on a screen that is different from the input and output device or as a printout on paper.

In the next process step 3, a check is performed to determine whether the production process can be carried out in a stable manner using the varied process control variable, i.e. whether process stability has been achieved or not. Process step 3 is carried out automatically. Checking the stability of the process is performed by means of process parameters that are correlated with the process control variables. A process control variable is correlated with at least one process parameter. The correlation is specific for the injection molding machine 10 and the cyclic production process. The correlation depends on normal external influences and, therefore, is difficult to determine and usually is not determined. If, for example, a specific injection speed is set as the process control variable, then a cavity pressure maximum value correlated therewith is calculated as a process parameter. If the process control variable is varied, for example the injection speed is lowered or increased, then the process parameter is varied in accordance with the correlation. Process stability is established if the identified process parameter variations are within a process stability limit. More details in this respect will be described in the description of FIG. 6.

In yet a further process step 4, a quality characteristic detected by the sensor 13 of the injection molded parts produced using the varied process control variable is checked as to whether it lies within a quality tolerance range for the injection molded parts produced, i.e. if acceptable parts have been obtained. Preferably, the injection molding machine 10 has several cavities in which several articles are produced in parallel in a production cycle at the same time. For example, eight articles are produced per production cycle of which seven are acceptable and one is a bad part. Applying zero tolerance with respect to quality, all eight articles would have to be acceptable.

If a decision 3.1 decides that the process is not stable (No N), then process step 2 will be repeated in iteration 2.1 in the next production cycle with a varied process control variable until process stability is achieved. If no process stability is achieved after a predetermined number of production cycles, then step 2 is repeated in iteration 2.1 with a varied process control variable having an absolute value of the amount of variation which is smaller than that of the previous process control variable. Decision 3.1 is carried out automatically.

If it is decided in decision 3.1 that process stability is achieved (Yes Y), then process step 4 checks whether acceptable or bad parts have been produced. Preferably, decision 4.1 is performed by an operator of the injection molding machine 10. Preferably, the operator removes injection molded parts produced at the monitoring unit 15 and checks them.

If it is decided in decision 4.1 that not all articles produced are acceptable (No N), then step 2 is repeated in iteration 2.2 with a varied process control variable. Preferably, in iteration 2.2 process step 2 is repeated with a varied process control variable having an absolute value of the amount of variation which is smaller than that of the previous process control variable.

In the following process step 5, if it is decided in decision 4.1 that all articles produced are acceptable (Yes Y), then the process parameter variation determined is assigned to the process parameter zone. Process step 5 is carried out automatically. Next, it will be decided whether establishing of the process parameter zone is to be continued. In process step 6, if it is decided in decision 5.1 that establishing of the process parameter zone is not to be continued (No N), then the process is completed. If it is decided in decision 5.1 that establishing of the process parameter zone shall be continued (Yes Y), then process step 2 is repeated in iteration 2.3 with a varied process control variable. Preferably, in iteration 2.3 process step 2 is repeated with a varied process control variable having an absolute value of the amount of variation which is greater than that of the previous process control variable. Preferably, decision 5.1 is made by an operator of injection molding machine 10.

Figure 3:
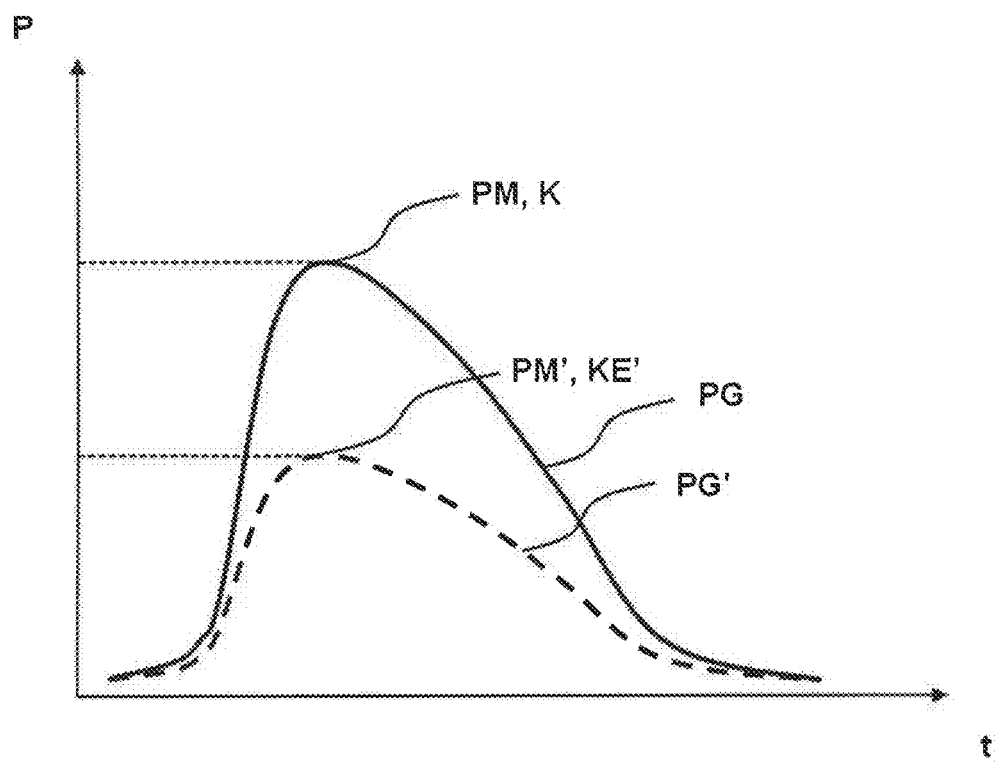
FIG. 3 shows a graphical representation of a first process parameter variation identified in process steps according to FIG. 2.
Figure 4:
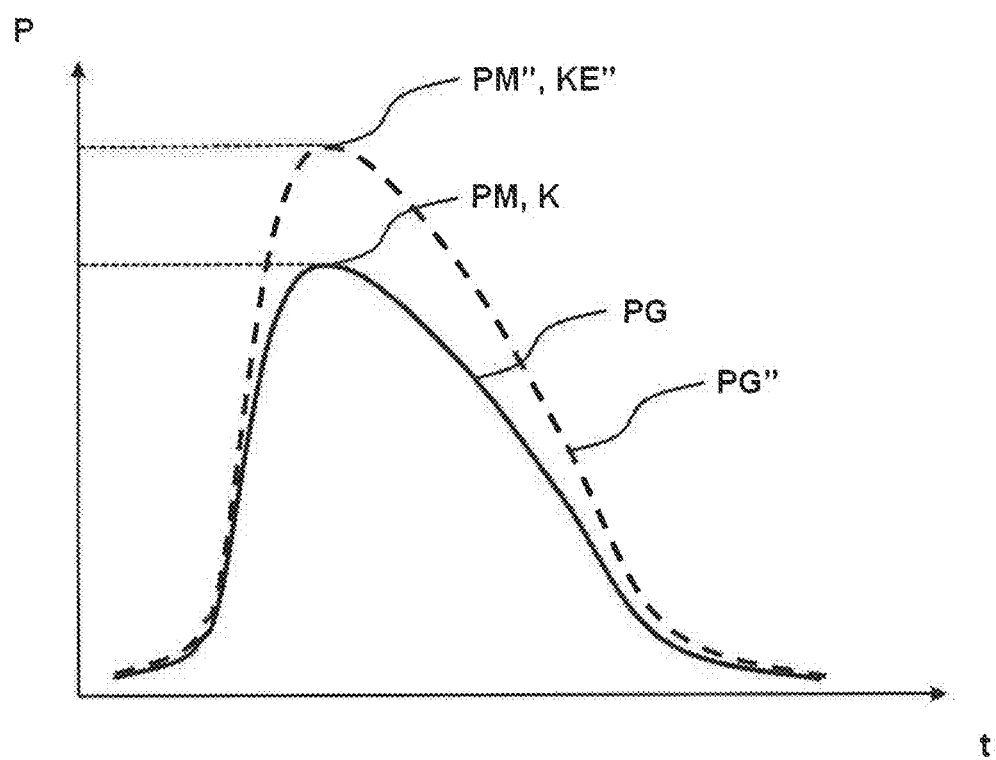
FIG. 4 shows a graphical representation of a second process parameter variation identified in process steps according to FIG. 2.
Figure 5:
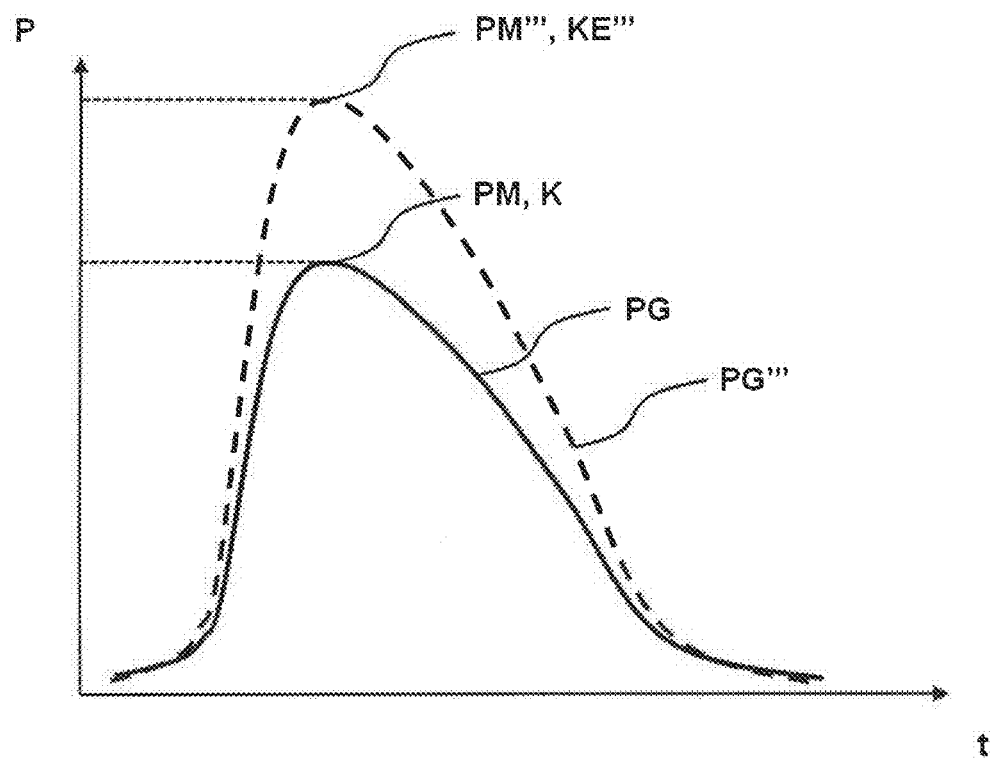
FIG. 5 shows a graphical representation of a third process parameter variation identified in process steps according to FIG. 2.

FIGS. 3 to 5 show a graphical representation of the determination of the process parameter variations KE', KE'', KE'''. For this purpose, a process control variable is preset, for example, an injection speed of 24 mm/sec is preset as the process control variable which results in stability of the production process and production of only acceptable parts. Cavity pressures of a production cycle are preset as sensor data. The production cycle will take 20 sec, for example. Dimensions of the cavity pressure are a pressure P and a time t. In the coordinate system of FIGS. 3 to 5, pressure P and time t are plotted as the ordinate and the abscissa, respectively. The development of the predefined cavity pressures with time is represented as a cavity pressure curve PG. A cavity pressure maximum value PM of the cavity pressure curve PG is the predefined process parameter K. Knowing the present invention, those skilled in the art can represent the determination of the process parameter variation alphanumerically and/or graphically on the input and output device 12 or on a screen different from the input and output device 12 or as a printout on paper. If an alphanumeric representation is chosen, then the development of the predefined cavity pressure with time is represented as a sequence of numbers and the cavity pressure maximum value is shown as a numerical value.

FIG. 3 shows a graphical representation of the determination of a first process parameter variation KE'. Preferably, the identification of process parameters is carried out first for which the pressure value P is smaller than the predefined process parameter K (cavity pressure maximum value PM) to be varied. Thus, the injection speed is lowered to 22 mm/sec (process step 2). This decreased injection speed is the varied process control variable. The injection molding machine 10 is operated with the lower injection speed and sensor data of the production process operated with the decreased injection speed are detected as first cavity pressures. Detected first cavity pressures are shown in FIG. 3 as the first cavity pressure curve PG'. A cavity pressure maximum value PM' of the first cavity pressure curve PG' represents the first process parameter variation KE'. The determination of variations of the predefined process parameter K can be repeated any number of times. Preferably, as little variations of the predefined process parameter K as possible are determined to save time and effort. Preferably two, particularly five variations of the predefined process parameter K are determined for which the pressure value P is smaller than the process parameter K to be varied.

FIG. 4 shows a graphical representation of the determination of a second process parameter variation KE". Preferably, process parameter variations are then determined that are higher with regard to the dimension of pressure P than the predetermined process parameter K (cavity pressure maximum value PM) to be varied. Thus, the injection speed is increased to 26 mm/sec (process step 2). This increased injection speed is the varied process control variable. Then, injection molding machine 10 is operated with the increased injection speed and sensor data of the production process carried out with the increased injection speed are detected as second cavity pressures Detected second cavity pressures are shown in FIG. 4 as the second cavity pressure curve PG". A cavity pressure maximum value PM" of the second cavity pressure curve PG" represents the second process parameter variation KE". Preferably two, particularly five, variations of the predefined process parameter K that are higher with regard to the pressure value P than the predefined process parameter K to be varied are determined.

FIG. 5 shows a graphical representation of the determination of a third process parameter variation KE'". Thus, the injection speed is increased to 27 mm/sec (process step 2). This increased injection speed is the process control variable varied. Injection molding machine 10 is operated with the increased injection speed and sensor data of the production process carried out with the increased injection speed are detected as third cavity pressures. Detected third cavity pressures are shown in FIG. 5 as the third cavity pressure curve PG'". A cavity pressure maximum value PM'" of the third cavity pressure curve PG'" is the third process parameter variation KE'".

Figure 6:
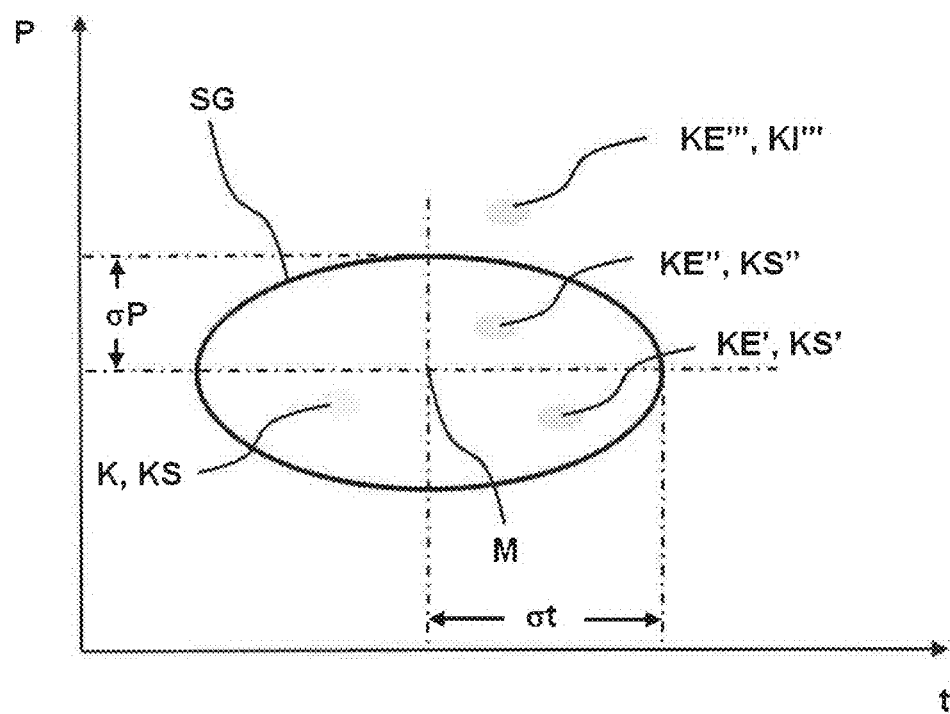
FIG. 6 shows a graphical representation of a process step according to FIG. 2 for establishing a process stability limit using process parameter variations according to FIGS. 3 to 5.

FIG. 6 shows a graphical representation of monitoring the process stability (process step 3). For example, the cavity pressure maximum value PM of a cavity pressure curve PG is used as a process parameter K and the maximum values of the cavity pressure PM', PM", PM'" of cavity pressure curves PG', PG", PG'" are used as process parameter variations KE', KE", KE'". Process parameter K is predetermined according to the description of FIGS. 3 to 5. Process parameter variations KE', KE", KE'" are determined from sensor data according to the description of FIGS. 3 to 5. Preferably, each process parameter K and each process parameter variation KE', KE", KE'" is already a mean value of several production cycles. The process parameter K and the process parameter variations KE', KE", KE'" are used to determine in a statistical selection procedure at least one criterion for process stability. Some examples of the outcome of the statistical selection procedure might include a standard deviation σP in the dimension of pressure P, a standard deviation σt in the dimension of time t, an arithmetic mean M, etc. Process stability is achieved if the process parameter K and the process parameter variations KE', KE", KE'" are within a process stability limit SG. In FIG. 6, the arithmetic mean M of the process parameter K and the process parameter variations KE', KE", KE'" are positioned in a center of an ellipsoid. A semi-major axis of the ellipsoid along the ordinate representing the pressure value P can be a single or multiple of the standard deviation σP. A semi-major axis of the ellipsoid along the abscissa representing the time value t can be a single or multiple of the standard deviation σP. A perimeter of the ellipsoid may be the process stability limit. The process parameter K and the process parameter variations KE', KE", KE'" are shown as four points. Three of the four points are located within the ellipsoid while one point is located outside the ellipsoid. The process parameter K being predefined by the three points located within the ellipsoid and the first and the second process parameter variations KE', KE" are stable in the process and are also referred to as stable process parameter KS and stable process parameter variations KS', KS", respectively. The third process parameter variation KE'" represented by the point outside of the ellipsoid is unstable in the process and is called unstable process parameter variations KI'". Knowing the present invention, not only the process parameter can be stored in the data storage device but also the stable process parameter variations can be stored in the data storage device and can be loaded as default stable process parameter variations from the data storage device. Thus, stable process parameter variations exist which can be used for establishing a process stability limit in a statistical selection process.

Process step 4 consists of checking whether the injection molded parts produced by means of a varied process control variable are acceptable parts. Preferably, the check is performed only for those injection molded parts produced of which the varied process control variable is correlated with a stable process parameter variation KS', KS". The devices dedicated for checking the injection molded parts produced check at least one quality characteristic such as a weight of the injection molded parts produced, a dimensional accuracy of the injection molded parts produced, a size of the injection molded parts produced, a burr formation on injection molded parts produced, a completeness of form filling in the production of the injection molded parts, burn marks on injection molded parts produced, etc. For each quality characteristic at least one corresponding quality tolerance range is predefined. If a quality characteristic of the injection molded parts produced is within a quality tolerance range for the injection molded parts produced, then the injection molded parts produced are classified as acceptable parts (decision 4.1).

In process step 5 a detected process parameter variation KE', KE", KE'" is assigned to the process parameter zone. A precondition for assigning a detected process parameter variation KE', KE", KE'" to the process parameter zone is that it must be stable in the process and that it must be correlated with a varied process control variable which results in the production of acceptable parts in the production process. In the example according to FIG. 6 the first and the second process parameter variations KE', KE" are stable in the process (and are also referred to as first and second stable process parameter variations KS', KS") and are correlated with a varied process control variable that results in the production of acceptable parts in the production process. Thus, the process parameter zone EO is established using the stable process parameters KS', KS".

Figure 7:
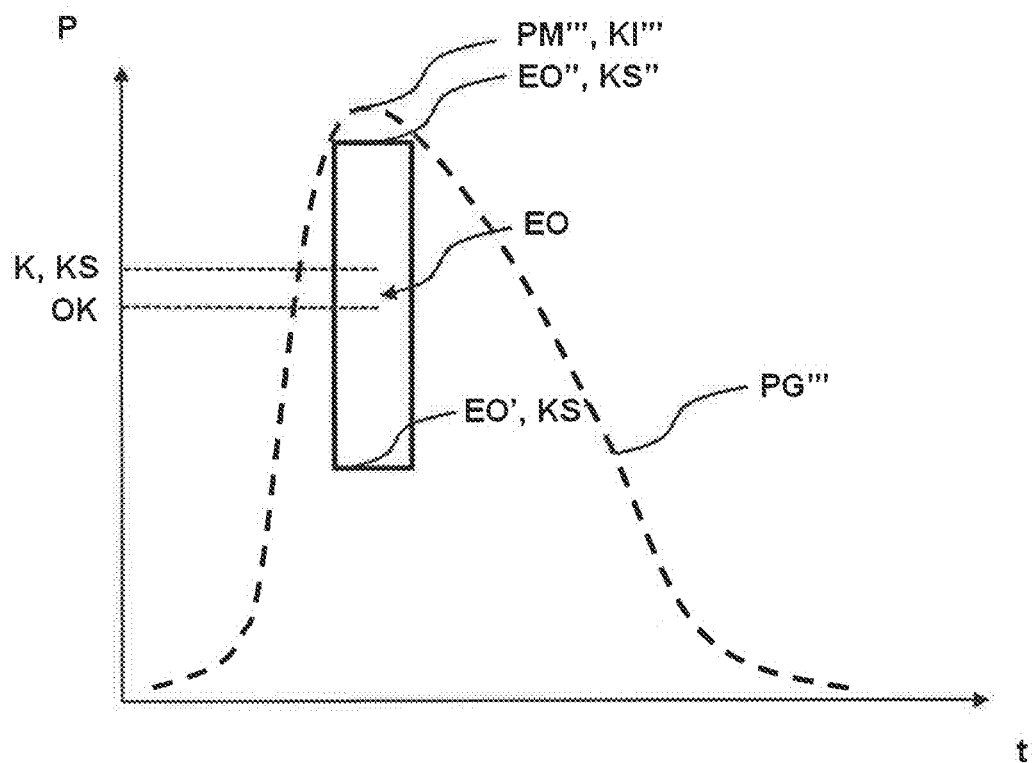
FIG. 7 shows a graphical representation of a first embodiment of a process parameter zone established in process steps according to FIG. 2.

FIG. 7 shows a graphical representation of a first embodiment of a process parameter zone EO from two stable process parameter variations KS', KS". The first stable process parameter variation KS' is a first cavity pressure maximum value PM' of the first cavity pressure curve PG' (see FIG. 3). The second stable process parameter variation KS" is a second cavity pressure maximum value PM" of the second cavity pressure curve PG" (see FIG. 4). The first stable process parameter variation KS' is smaller in the dimension of pressure P than the second stable process parameter variation KS". Thus, the first stable process parameter variation KS' establishes a first process parameter limit EO' of the process parameter zone EO and the second stable process parameter variation KS" establishes a second process parameter limit EO" of the process parameter zone EO. Preferably, the process parameter zone EO is polygonal and in the first embodiment according to FIG. 7 the process parameter zone EO is rectangular so that the first process parameter limit EO' forms the bottom side of the rectangle and the second process parameter limit EO" forms the top side of the rectangle. Being aware of the present invention, the skilled artisan can represent the process parameter zone alphanumerically or graphically on the input and output device or on a screen different from the input and output device or as a printout on paper. Also, the skilled artisan may establish a process parameter zone consisting of a single stable process parameter variation. In this case, the process parameter zone is in the form of a line, of points, etc.

An optimized process parameter OK is positioned in the center of the process parameter zone EO. The optimized process parameter OK is positioned equidistantly from the process parameter limits EU', EO". Thus, the optimized process parameter OK is arranged symmetrically between process parameter limits EO', EO" and therefore has an as large safety margin as possible with respect to process parameter limits EO', EO". Preferably, the predefined process parameter K that is correlated with the predefined process control variable is stable in the process (and is also called stable process parameter KS) and is positioned asymmetrically so that the safety margin with respect to the first process parameter limit EO' is greater than that with respect to the second process parameter limit EO". The optimized process parameter OK serves as a guideline in monitoring the process parameters of the ongoing production process. Thus, a process control variable correlated with the process parameter can be changed prophylactically if process parameters of the ongoing production process drift off from the optimized process parameter OK and approach a process parameter limit EO', EO".

Figure 8:
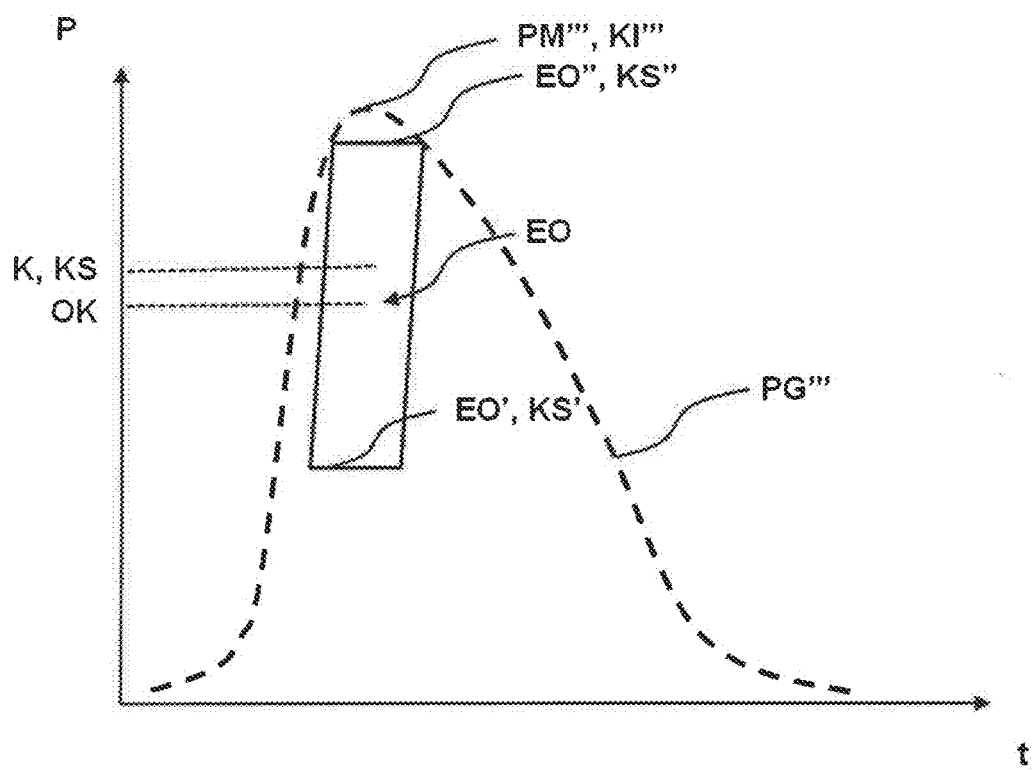
FIG. 8 shows a graphical representation of a second embodiment of a process parameter zone established in process steps according to FIG. 2.
Figure 9:
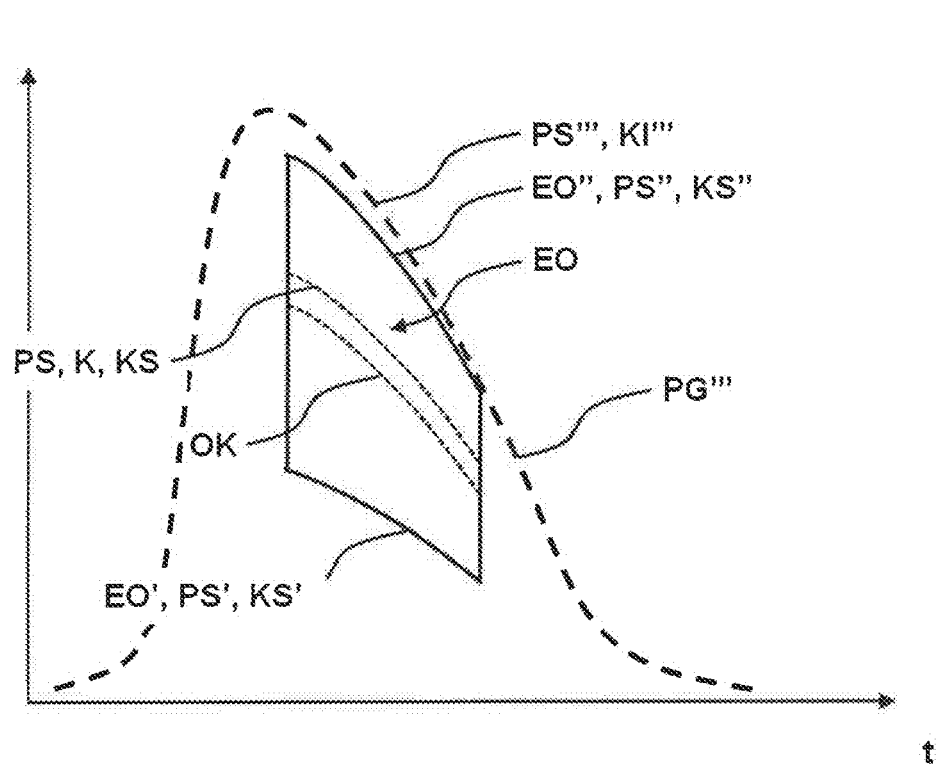
FIG. 9 shows a graphical representation of a third embodiment of a process parameter zone established in process steps according to FIG. 2.

Knowing the present invention, the skilled artisan can also implement other embodiments of process parameter zones EO, as shown in FIGS. 8 and 9. The description of FIGS. 8 and 9 is based on that of FIG. 7 so that only variations therefrom will be explained in the following. In the second embodiment of a process parameter zone EO according to FIG. 8 the process parameter EO is shaped as a parallelogram so that the first process parameter limit EO' forms a bottom side of the parallelogram and the second process parameter limit EO" forms a top side of the parallelogram.

In the third embodiment of a process parameter zone EO according to FIG. 9 the process parameter EO is a polygon with straight or curved sides so that the first process parameter limit EO' forms a bottom side of the polygon and the second process parameter limit EO" forms a top side of the polygon. As the predetermined process parameter K and stable process parameter variations KS', KS" the cavity pressure slopes PS, PS', PS" of the cavity pressure curves PG, PG', PG" are used. As the unstable process parameter variations K''' a cavity pressure slope PS''' of the cavity pressure curves PG''' is used.

The process parameter zone EO serves as a control mask for a production cycle of the ongoing production process wherein at least one process parameter KE is determined from sensor data. Preferably, the development of the process parameter KE determined with time is displayed graphically as a cavity pressure curve PME. Preferably, the process parameter zone EO is superimposed with the determined process parameter KE and/or the cavity pressure curve PME. Preferably, the superimposition is carried out in real time wherein in this case the production cycle is the production cycle of the ongoing production process that is currently executed. If this is true, then monitoring information is issued to indicate that the production cycle of the ongoing production process produces acceptable parts. Knowing the present invention, those skilled in the art can implement an alphanumerical or graphical representation of the superimposition of the process parameter zone EO with the process parameter recorded and/or the cavity pressure curve on the input and output device or on a screen different from the input and output device or as a printout on paper.

Figure 10:
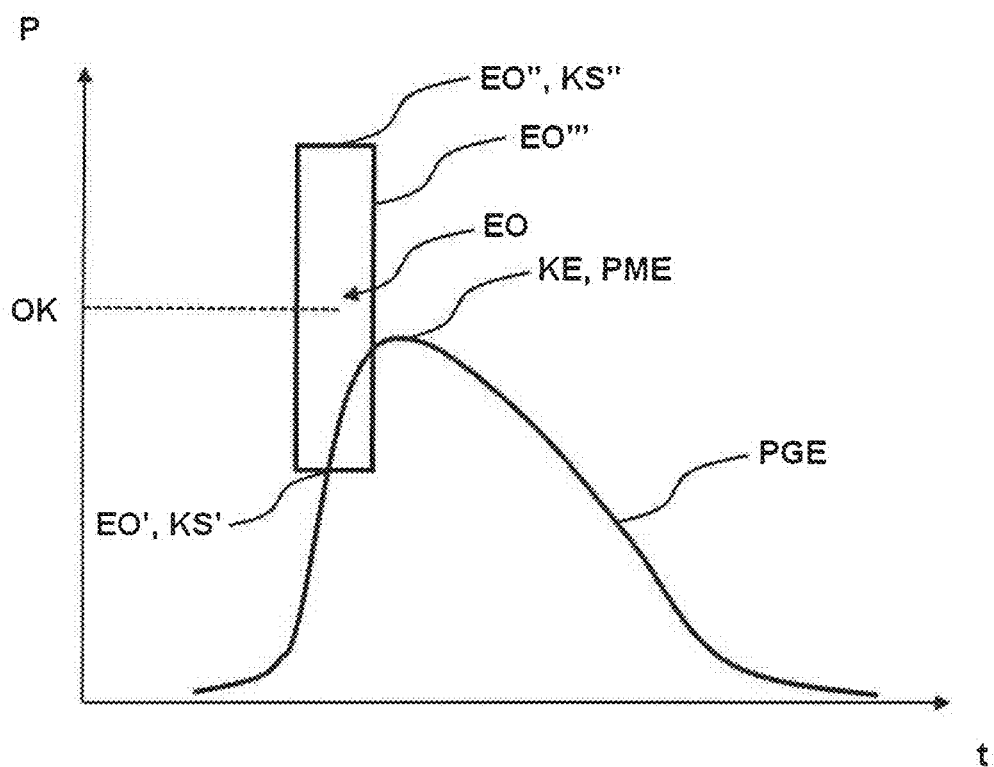
FIG. 10 shows a graphical representation of a superposition of a determined process parameter of a production cycle of an ongoing production process with the first embodiment of the process parameter zone according to FIG. 7.

According to FIG. 10 a cavity pressure maximum value PME of a production cycle of the ongoing production process is determined as the process parameter KE. According to FIG. 11 a cavity pressure slope PSE of a production cycle of the ongoing production process is determined as the process parameter KE.

Figure 11:
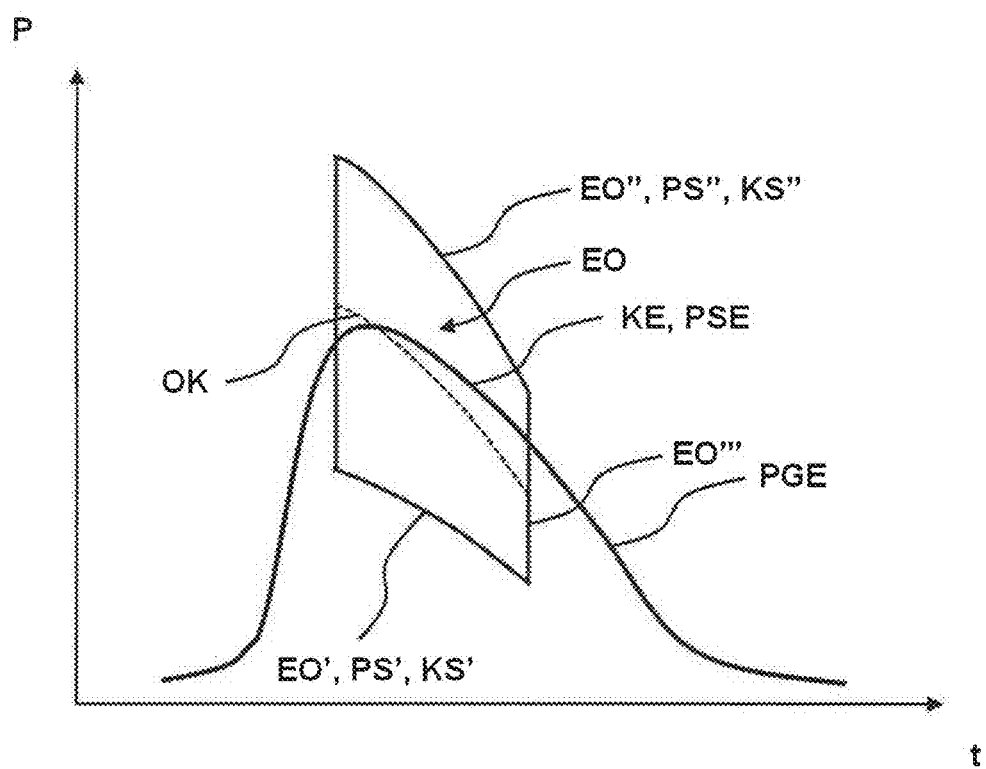
FIG. 11 shows a graphical representation of a superposition of a determined process parameter of a production cycle of an ongoing production process with the third embodiment of the process parameter zone according to FIG. 9.

In a first alternative, monitoring whether the process parameter KE determined lies within the process parameter zone EO is performed. In the sense of the invention, a determined process parameter KE that touches or intersects a process parameter limit EO', EO", EO''' is also regarded as being located within the process parameter zone EO. If the determined process parameter KE lies within the process parameter zone EO, then monitoring information is issued to indicate that the production cycle produces acceptable parts. As shown in FIG. 10 the cavity pressure maximum value PME lies outside the process parameter zone EO so that monitoring information is issued that the production cycle does not produce acceptable parts. As shown in FIG. 11 the cavity pressure slope PSE lies within the process parameter zone EO so that monitoring information is issued that the production cycle produces acceptable parts.

In a second alternative monitoring as to whether the cavity pressure curve PGE lies within the process parameter zone EO in certain areas is carried out. If the cavity pressure curve PGE lies within the process parameter zone EO in certain areas, then monitoring information is issued to indicate that the production cycle produces acceptable parts. As shown in FIGS. 10 and 11 the cavity pressure curve PGE lies within the process parameter zone EO in certain areas so that monitoring information is issued that the production cycle produces acceptable parts.

In another alternative, monitoring whether the cavity pressure curve PGE intersects at least one process parameter zone limit EO', EO", EO''' of the process parameter zone EO is performed. Monitoring whether the cavity pressure curve PGE intersects the first process parameter zone limit EO' is performed. If the cavity pressure curve PGE intersects the first process parameter zone limit EO', then monitoring information is issued to indicate that the production cycle produces acceptable parts. According to FIG. 10 the cavity pressure curve PGE intersects the first process parameter zone limit EO' so that monitoring information that the production cycle produces acceptable parts is issued. As shown in FIG. 11 no intersection between the cavity pressure curve PGE and the first process parameter zone limit EO' is observed so that monitoring information is issued that the production cycle does not produce acceptable parts.

In yet another alternative a highest detected process parameter variation with respect to the dimension of time t is used as the third process parameter limit EO''' of the process parameter zone. Monitoring whether the cavity pressure curve PGE intersects the third process parameter zone limit EU''' is carried out. If the cavity pressure curve PGE intersects the third process parameter zone limit EO''', then monitoring information is issued to indicate that the production cycle produces acceptable parts. As shown in FIGS. 10 and 11 the cavity pressure curve PGE intersects the third process parameter zone limit EO''' so that monitoring information is issued that the production cycle produces acceptable parts.

Being aware of the present invention, those skilled in the art can combine the various alternatives of monitoring of the process parameters detected and/or the cavity pressure curve by means of the process parameter zone. Thus, monitoring whether the cavity pressure curve PGE intersects the first process parameter zone limit EO' and the third process parameter zone limit EO''' can be carried out. If the cavity pressure curve PGE intersects both the process parameter zone limit EO' and EO''', then monitoring information is issued to indicate that the production cycle produces acceptable parts. According to FIG. 10, the cavity pressure curve PGE intersects both the process parameter zone limit EO' and EO''' so that monitoring information is issued that the production cycle produces acceptable parts. According to FIG. 11, there is no intersection between the cavity pressure curve PGE and the two process parameter zone limits EO', EO''' so that monitoring information is issued to indicate that the production cycle does not produce acceptable parts.

The embodiments of the process parameter zone EO depend on the type of quality characteristic of the injection molded parts produced and the type of quality tolerance range for the injection molded parts produced. The embodiments of the process parameter zone EO can also be combined with each other. Indeed, in the injection molding process a molded part is formed in the phases of filling a cavity with a melt, compressing the melt and curing of the molded part. The first two phases take place before the cavity pressure maximum is reached while the third phase occurs afterwards. For checking the completeness of form filling (Short Shot) in the production of injection molded parts, preferably a polygonal process parameter zone EO is used with the cavity pressure maximum value as a process parameter. For checking burn marks on injection molded parts produced, preferably a polygonal process parameter zone EO is used with the cavity pressure slope as a process parameter (FIG. 11). For checking the dimensional accuracy of injection molded parts produced and/or the size of injection molded parts produced or a burr formation on injection molded parts produced, preferably a polygonal process parameter zone EO is used with the cavity pressure maximum value as process parameter (FIG. 10) and/or a polygonal process parameter zone EO is used with the cavity pressure slope as a process parameter (FIG. 11).

It is also possible to add a determined process parameter KE to the process parameter zone EO in a production cycle of the ongoing production process. For this purpose, the determined process parameter KE must be stable in the process and the determined process parameter KE must be correlated with a process control variable that results in the production of acceptable parts in the production process. Using such a determined process parameter KE that is added to the process parameter zone EO it is possible to adapt and to modify process parameter zone limits EO', EO'', EO''' of the process parameter zone EO with respect to a dimension such as pressure P.

LIST OF REFERENCE NUMERALS

1-6 process step
2.1, 2.2, 2.3 iteration
3.1, 4.1, 5.1 decision
10 injection molding machine
11 components
12 input and output device
13 sensor
14 control unit
15 monitoring unit
EO process parameter zone
EO', EO'', EO''' process parameter limit
OK optimized process parameter
P cavity pressure
PG-PG''' cavity pressure curve
PGE determined cavity pressure curve
PM-PM''' cavity pressure maximum value
PME determined cavity pressure maximum value
PS-PS''' cavity pressure slope
PSE determined cavity pressure slope
K predetermined process parameter
KE determined process parameter
KE', KE'', KE''' determined process parameter variation
KI''' unstable process parameter variation
KS stable process parameter
KS', KS'' stable process parameter variation
SG process stability limit
$\sigma K$, $\sigma t$ standard deviation
t time

The invention claimed is:

1. A process for performing a cyclic production process wherein articles are produced in said production process; where the production process is set via at least one process control variable; and wherein at least one quality characteristic of the articles produced and at least one quality tolerance range for the articles produced are predefined; the process comprising the steps of:
   a) varying a first process control variable;
   b) determining automatically for the varied first process control variable a first process parameter variation, wherein there is a correlation between the process control variable and at least one process parameter, and wherein the at least one process parameter is varied in accordance with the correlation;
   c) checking automatically whether the first process parameter variation lies within a process stability limit and is stable in the process;
   d) checking automatically whether at least one quality characteristic of the articles produced with the varied first process control variable is within the at least one quality tolerance range for the articles produced and therefore acceptable parts have been produced; and
   e) automatically establishing a first process parameter zone for the first process parameter variation which is stable in the process and the process control variable of which results in the production of acceptable parts.

2. The process according to claim 1, further comprising determining a first process parameter zone limit of the first process parameter zone using a process parameter variation which is the smallest with respect to a dimension of a process parameter; or determining a second process parameter zone limit using a process parameter variation that is the highest with respect to a dimension of the process parameter.

3. The process according to claim 1, further comprising: using sensor date to determine for a production cycle of the ongoing production process at least one process parameter; and checking whether the process parameter determined from sensor data lies within the process parameter zone.

4. The process according to claim 3, wherein if the process parameter determined from sensor data lies within the process parameter zone then issuing monitoring information that the production cycle produces acceptable parts.

5. The process according to claim 1, wherein the production process is an injection molding process wherein an injection speed and/or a holding pressure is used as the predetermined process control variable and wherein injection molded parts are produced as the articles.

6. The process according to claim 5, wherein a cavity pressure maximum value is used as the process parameter.

7. The process according to claim 5, wherein for checking completeness of a mold filling in the production of injection molded parts, using a polygonal process parameter zone with the cavity pressure maximum value as the process parameter.

8. The process according to claim 5, wherein for checking a dimensional accuracy of injection molded parts produced and/or a size of injection molded parts produced or a burr formation on injection molded parts produced, using a polygonal process parameter zone with the cavity pressure maximum value as the process parameter or with the cavity pressure slope as the process parameter.

9. The process according to claim 5, wherein a cavity pressure slope is used as the process parameter.

10. The process according to claim 1, further comprising determining a first process parameter zone limit of the first process parameter using a process parameter variation which is the smallest with respect to a dimension of a process parameter; and using a process parameter variation, which is the highest with respect to a dimension of the process parameter, to determine a second process parameter zone limit.

11. A process for performing a cyclic production process wherein articles are produced in said production process, where the production process is set via at least one process control variable, and wherein at least one quality characteristic of the articles produced and at least one quality tolerance range for the articles produced are predefined, the process comprising the steps of:
  a) varying a first process control variable;
  b) determining automatically for the varied first process control variable a first process parameter variation;
  c) checking automatically whether the first process parameter variation lies within a process stability limit and is stable in the process;
  d) checking automatically whether at least one quality characteristic of the articles produced with the varied first process control variable is within the at least one quality tolerance range for the articles produced and therefore acceptable parts have been produced; and
  e) automatically establishing a first process parameter zone for the first process parameter variation which is stable in the process and the process control variable of which results in the production of acceptable parts; and
  wherein for a varied process control variable using a first stable process parameter variation in a statistical selection procedure to establish at least one process stability limit.

12. The process according to claim 11, wherein a process control variable is predetermined to correlate with at least one predetermined process parameter; and sensor data is used to determine said first stable process parameter variation.

13. The process according to claim 11, wherein using said predetermined process parameter and said stable process parameter variation to determine an arithmetic mean and a standard deviation; positioning the arithmetic mean in a center of an ellipsoid; and using said standard deviation to define a single or multiple of half-major axes of the ellipsoid; and using the perimeter of the ellipsoid to define the process stability limit.

14. The process according to claim 11, wherein the step of checking whether acceptable parts have been produced is performed only for such articles produced when the varied process control variable is correlated with a stable process parameter variation.

15. A process for performing a cyclic production process wherein articles are produced in said production process, where the production process is set via at least one process control variable, and wherein at least one quality characteristic of the articles produced and at least one quality tolerance range for the articles produced are predefined, the process comprising the steps of:
  a) varying a first process control variable;
  b) determining automatically for the varied first process control variable a first process parameter variation;
  c) checking automatically whether the first process parameter variation lies within a process stability limit and is stable in the process;
  d) checking automatically whether at least one quality characteristic of the articles produced with the varied first process control variable is within the at least one quality tolerance range for the articles produced and therefore acceptable parts have been produced; and
  e) automatically establishing a first process parameter zone for the first process parameter variation which is stable in the process and the process control variable of which results in the production of acceptable parts;
  f) using sensor date to determine for a production cycle of the ongoing production process at least one process parameter; and checking whether the process parameter determined from sensor data lies within the process parameter zone; and
  g) generating a graphical representation of a development of the process parameter as a function of time; superimposing the graphical representation of the process parameter with the process parameter zone; checking whether said graphical representation of the process parameter lies within the process parameter zone (EO); and if the graphical representation of the process parameter lies within the process parameter zone (EO), then issuing monitoring information that the production cycle produces acceptable parts.

16. The process according to claim 15, wherein for a production cycle of the ongoing production process cavity pressures are used as a process parameter; that the development of the cavity pressures detected with time is represented graphically as a cavity pressure curve; that the cavity pressure curve is superimposed with the process parameter zone; checking whether the cavity pressure curve lies within the process parameter zone; and if the cavity pressure curve lies within the process parameter zone then issuing monitoring information that the production cycle produces acceptable parts.

17. The process according to claim 15, further comprising checking whether the graphical representation of the process parameter intersects at least one process parameter zone limit.

* * * * *